United States Patent
Weber

(10) Patent No.: US 8,336,493 B1
(45) Date of Patent: Dec. 25, 2012

(54) PET FEEDER WITH INSERTABLE RAMP

(75) Inventor: Adam W. Weber, Keller, TX (US)

(73) Assignee: Doskocil Manufacturing Company, Inc., Arlington, TX (US)

( * ) Notice: Subject to any disclaimer, the term of this patent is extended or adjusted under 35 U.S.C. 154(b) by 271 days.

(21) Appl. No.: 12/624,498

(22) Filed: Nov. 24, 2009

(51) Int. Cl.
*A01K 5/00* (2006.01)

(52) U.S. Cl. ........................................ 119/52.1

(58) Field of Classification Search ............ 119/51.01, 119/52.1, 58, 60, 61.5, 72, 74, 900, 52.4, 119/53, 51.5; D30/133, 121, 129, 130, 132
See application file for complete search history.

(56) References Cited

U.S. PATENT DOCUMENTS

| | | |
|---|---|---|
| 3,720,184 A | 3/1973 | Pearce |
| 4,573,434 A | 3/1986 | Gardner |
| 4,721,063 A | 1/1988 | Atchley |
| 4,947,796 A | 8/1990 | Robinette |
| 5,109,799 A | 5/1992 | Lader |
| D330,098 S | 10/1992 | VanSkiver |
| D334,251 S | 3/1993 | Tiu |
| 5,259,336 A | 11/1993 | Clark |
| D350,841 S | 9/1994 | VanSkiver |
| D350,842 S | 9/1994 | VanSkiver |
| D351,689 S | 10/1994 | VanSkiver |
| 5,353,739 A * | 10/1994 | Chu ........................... 119/51.03 |
| 5,467,735 A | 11/1995 | Chrisco |
| D364,942 S | 12/1995 | VanSkiver et al. |
| D367,735 S | 3/1996 | VanSkiver et al. |
| D374,109 S | 9/1996 | Lillelund et al. |
| 5,794,560 A | 8/1998 | Terenzi |
| 5,819,686 A | 10/1998 | Credeur |
| D406,924 S | 3/1999 | Kolozsvari |
| D406,926 S | 3/1999 | Kolozsvari |
| 6,055,932 A | 5/2000 | Weber |
| 6,142,099 A | 11/2000 | Lange, Jr. |
| D455,526 S | 4/2002 | Chrisco |
| D458,419 S | 6/2002 | Ross |
| 6,477,981 B1 | 11/2002 | Harper |
| 6,863,025 B2 * | 3/2005 | Ness ................................. 119/72 |

* cited by examiner

*Primary Examiner* — T. Nguyen

(74) *Attorney, Agent, or Firm* — Eckert Seamans Cherin & Mellott, LLC; Brij K. Agarwal

(57) ABSTRACT

A pet feeder includes a food container. A base supports the food container and includes a food storage area for receiving food from the food container. The base also includes a bowl for allowing a pet access to food. The bowl is disposed adjacent to the food storage area. The pet feeder further includes a ramp adapted to be inserted into the food storage area for directing food from the food container to the bowl.

2 Claims, 2 Drawing Sheets

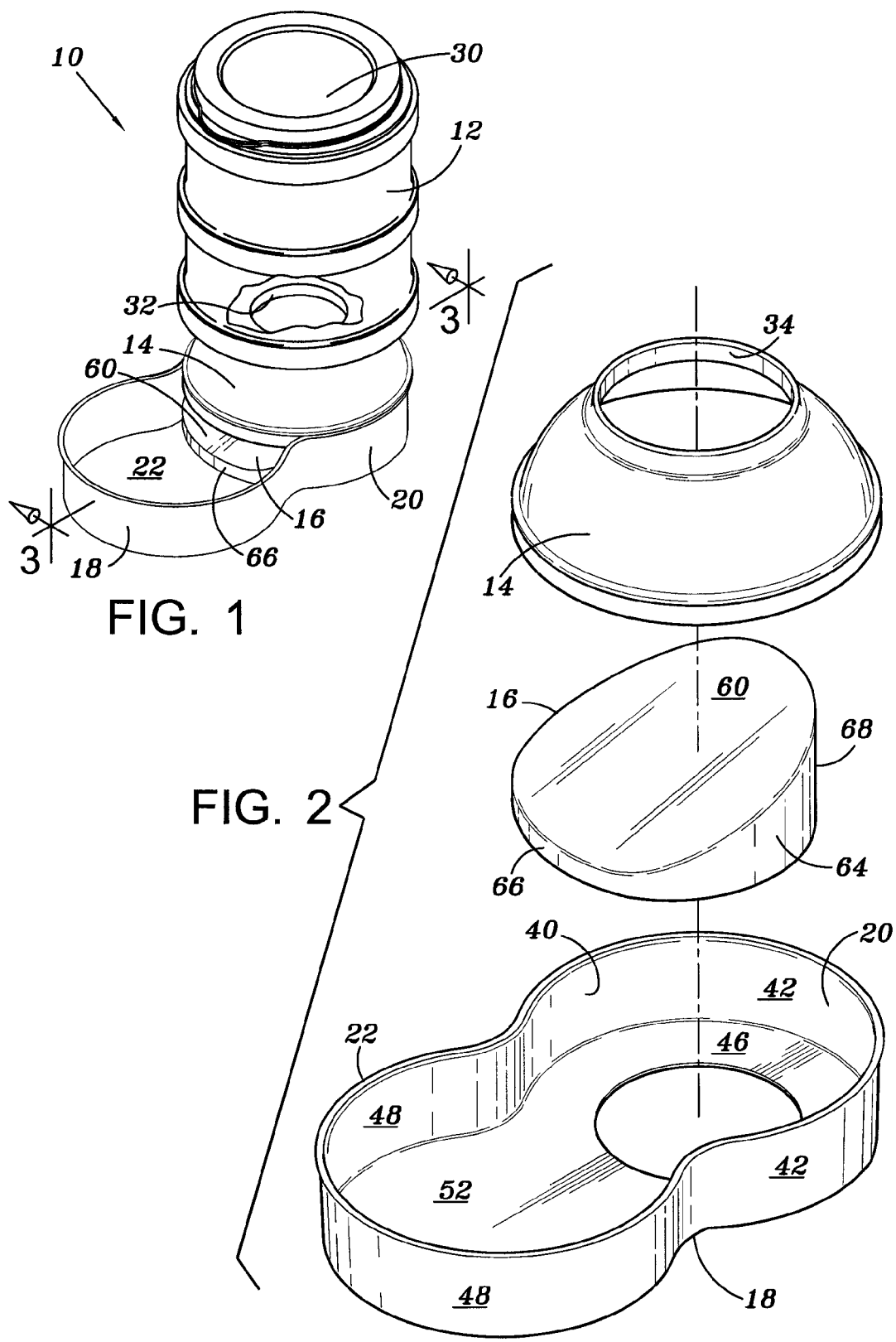

PET FEEDER WITH INSERTABLE RAMP

TECHNICAL FIELD OF THE INVENTION

The present invention relates generally to pet feeding devices, and more particularly to a continuous and gravity fed pet feeder including an insertable ramp.

BACKGROUND ART OF THE INVENTION

Pet feeders typically contain large inverted food storage containers that gravity feed pet food into a base portion having a food bowl. By using these devices, pet owners have the convenience of feeding their pets less frequently as the food dispensing function is performed automatically and pet owners can be away from their pets for longer periods of time.

Such pet feeders typically utilize a ramp disposed between the inverted food storage container and the food bowl to assist the food flowing from the food storage container into the bowl. In pet feeders that are molded from plastic, the ramp is typically integrally molded with the bowl and base that supports the storage container. However, in the event that plastic material is not utilized for the pet feeder and, for example, stainless steel is utilized, the fabrication of an integral ramp is difficult as well as being costly to the manufacturing process. Therefore, a need has arisen for a pet feeder which utilizes a ramp to assist in transport of food from a food storage container to a food bowl which can be fabricated as an independent component for insertion into a pet feeder.

SUMMARY OF THE INVENTION

In accordance with the present invention, a pet feeder is provided which includes a food container. A base supports the food container and includes a food storage area for receiving food from the food container. The base also includes a bowl for allowing a pet access to food. The bowl is disposed adjacent to the food storage area. The pet feeder further includes a ramp adapted to be inserted into the food storage area for directing food from the food container to the bowl.

BRIEF DESCRIPTION OF THE DRAWINGS

For a more complete understanding of the present invention and for further advantages thereof, reference is now made to the following description of the preferred embodiments taken in conjunction with the accompanying drawings in which:

FIG. 1 is a perspective view of the present pet feeder;

FIG. 2 is an exploded perspective view of the feeder shown in FIG. 1 without the food container.

DESCRIPTION OF THE PREFERRED EMBODIMENT

Figure 3:
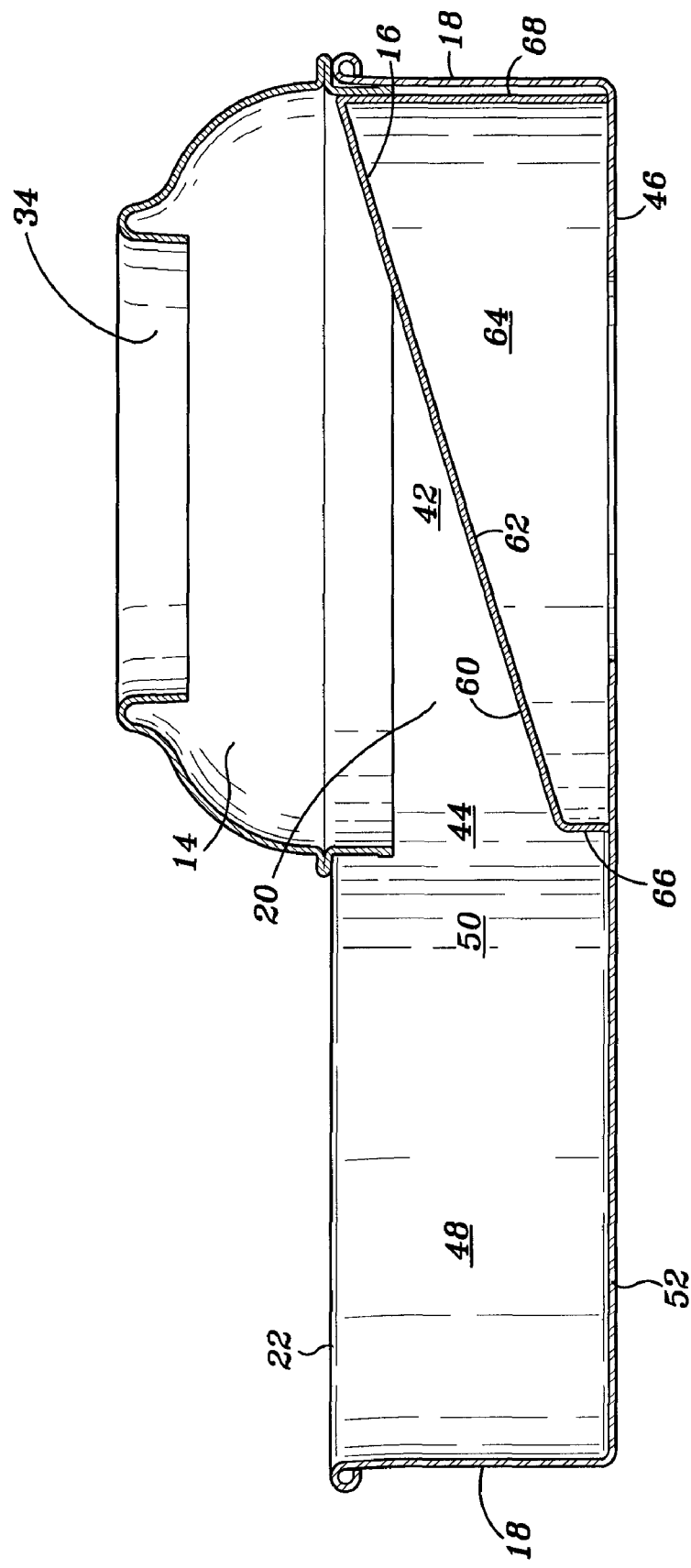
FIG. 3 is a sectional view taken generally along sectional lines 3-3 of FIG. 1.

Referring simultaneously to FIGS. 1, 2 and 3, the present pet feeder is illustrated, and is generally identified by the numeral 10. Pet feeder 10 includes a food container 12, a container support 14, a ramp 16 and a base 18. Base 18 includes a food storage area 20 and a bowl 22.

Ramp 16 is a separately fabricated component and is sized to be insertable within food storage area 20 of base 18. Ramp 16 may be fabricated from metal or plastic, and be attachable to food storage area 20 via heating or welding.

Food container 12 includes a lid 30 which is removable for filling food container 12. Food container 12 further includes an opening 32 for dispensing food contained within food container 12.

Support 14 includes an opening 34 which is in alignment with opening 32 through which food passes to ramp 16. Support 14 is attachable to food storage area 20.

Food storage area 20 includes an open top 40 for receiving ramp 16. Food storage area 20 further includes a sidewall 42 having an opening 44. Food storage area 20 further includes a bottom wall 46.

Bowl 22 includes a sidewall 48 having an opening 50. Bowl 22 further includes a bottom wall 52. Opening 50 of bowl 22 is in alignment with opening 44 of sidewall 42 of food storage area 20. Stored food flows from food storage area 20 into bowl 22 via openings 44 and 50 of food storage area 20 and bowl 22, respectively. Food therefore flows from food container 12 through support 14, down ramp 16 and through food storage area 20 into bowl 22.

Ramp 16 includes a top surface 60 and a bottom surface 62. Extending from bottom surface 62 is a skirt 64. Skirt 64 includes a front 66 and a rear 68. Front 66 of skirt 64 is shorter in length than the length of rear 68. Ramp 16 is positioned within food storage area 20, such that skirt 64 extends to bottom wall 46 of food storage area 20. Therefore, ramp 16 is easily locatable within food storage area 20 prior to attachment to base 18 of feeder 10.

Ramp 16 extends to sidewall 42 of food storage area 20 to prevent food being trapped between sidewall 42 and ramp 16.

I claim:

1. A pet feeder comprising:

a food container;

a base for supporting said food container, said base having a food storage area for receiving food from said food container, said food storage area having a bottom wall and a sidewall extending from said bottom wall, said sidewall including an aperture;

said base further including a bowl for allowing a pet access to food, said bowl disposed adjacent said food storage area and includes a bottom wall and a sidewall extending from said bottom wall, said sidewall having an aperture in alignment with said sidewall aperture of said food storage area; and a ramp adapted to be inserted into said food storage area for directing food from said food container to said bowl via said food storage area sidewall aperture and said bowl sidewall aperture and wherein said ramp extends to said food storage area sidewall, the ramp comprising a perimeter-disposed skirt for positioning said ramp within said food storage area, the skirt being shorter at a first end adjacent the bowl than at a second end opposite the first end.

2. The pet feeder of claim 1 wherein said skirt extends to said food storage area bottom wall.

* * * * *